(12) United States Patent
Rey

(10) Patent No.: US 12,501,260 B2
(45) Date of Patent: Dec. 16, 2025

(54) SECURITY SIGNATURE FOR BLUETOOTH LOW ENERGY FRAME SYNCH DETECTION

(71) Applicant: Cypress Semiconductor Corporation, San Jose, CA (US)

(72) Inventor: Claudio Rey, Chandler, AZ (US)

(73) Assignee: Cypress Semiconductor Corporation, San Jose, CA (US)

( * ) Notice: Subject to any disclaimer, the term of this patent is extended or adjusted under 35 U.S.C. 154(b) by 452 days.

(21) Appl. No.: 17/896,928

(22) Filed: Aug. 26, 2022

(65) Prior Publication Data

US 2024/0073678 A1 Feb. 29, 2024

(51) Int. Cl.
*H04W 4/80* (2018.01)
*H04L 9/32* (2006.01)
*H04W 12/03* (2021.01)

(52) U.S. Cl.
CPC .......... *H04W 12/03* (2021.01); *H04L 9/3247* (2013.01); *H04W 4/80* (2018.02)

(58) Field of Classification Search
CPC ........ H04W 12/03; H04W 4/80; H04L 9/324; H04L 9/3247
See application file for complete search history.

(56) References Cited

U.S. PATENT DOCUMENTS

| | | | |
|---|---|---|---|
| 6,058,150 A * | 5/2000 | Ghosh | H04L 7/042 370/514 |
| 7,929,927 B2 | 4/2011 | Norris et al. | |
| 9,794,056 B1 | 10/2017 | Tamma et al. | |
| 10,530,905 B1 * | 1/2020 | Rey | H04L 69/22 |
| 10,819,544 B2 | 10/2020 | Stanciu et al. | |
| 10,862,505 B1 | 12/2020 | Rey et al. | |
| 10,862,728 B1 | 12/2020 | Rey et al. | |
| 10,862,729 B1 | 12/2020 | Rey et al. | |
| 11,545,982 B2 | 1/2023 | Perin et al. | |
| 11,621,898 B2 | 4/2023 | Stanciu et al. | |
| 2001/0043574 A1 * | 11/2001 | Nguyen | H01Q 3/005 370/316 |
| 2004/0000986 A1 * | 1/2004 | Ott | G01S 13/84 340/541 |
| 2012/0050547 A1 * | 3/2012 | Gaddam | H04L 27/0012 348/192 |
| 2019/0049614 A1 * | 2/2019 | Griffing | E21B 47/12 |
| 2019/0207635 A1 * | 7/2019 | Sahu | H04B 1/16 |

FOREIGN PATENT DOCUMENTS

| | | |
|---|---|---|
| EP | 3264701 B1 | 2/2019 |
| EP | 3706380 A1 | 9/2020 |
| EP | 3731478 A3 | 10/2020 |
| EP | 3737055 A1 | 11/2020 |
| EP | 4064568 A1 | 9/2022 |

\* cited by examiner

*Primary Examiner* — Tod R Swann
*Assistant Examiner* — Daniel Elahian

(57) ABSTRACT

A wireless device includes a transmitter adapted with Bluetooth® low energy (BLE) capability and logic at least one of coupled to or integrated within the transmitter. The logic randomly generates a frequency offset based on bits within a frame synch packet to be transmitted during a keyless access attempt of an enclosure having a receiver. The logic causes the bits of the frame synch packet to be encrypted with an encryption key. The logic causes a frequency of the frame synch packet to modified by the frequency offset before the transmitter transmits the frame synch packet to the receiver.

19 Claims, 10 Drawing Sheets

SECURITY SIGNATURE FOR BLUETOOTH LOW ENERGY FRAME SYNCH DETECTION

TECHNICAL FIELD

This disclosure relates to wireless networks and, more specifically, to a security signature for Bluetooth® low energy (BLE) frame synch detection.

BACKGROUND

Personal area networks (PANs), such as Bluetooth® (BT), Bluetooth® Low Energy (BLE), Zigbee®, infrared, and the like provide wireless connection for various personal, industrial, scientific, and medical applications. PANs generally use a packet-based protocol and have an architecture that includes central devices (CDs) and peripheral devices (PDs). A CD may communicate with multiple PDs over the PAN.

Some PANs, such as based on BLE technology, have communication ranges similar to BT networks but have a considerably smaller power consumption and cost. Further, BLE devices often remain in a sleep mode and transition to an active mode when data communication is about to happen. BLE protocol also supports mesh networking, in which data can flow over multiple paths, and which does not rely on a rigid hierarchical structure of devices, often allowing the same devices to serve as CDs or PDs, depending on particular network conditions and topology.

Additionally, some PANs are used in wireless devices (e.g., CDs) that are included in or associated with lock mechanisms of enclosures (such as a residence, a vehicle, a garage, shed, or the like) and used to provide secure keyless access to persons in possession of a keyed PD, e.g., also referred to as keyless entry. A keyed PD (which could be a mobile device such as a smartphone, for example) may transmit a particular data pattern within a frame delimiter of a packet using BLE distance estimation technology, e.g., in order to estimate round trip timing (RTT) of packets. The wireless CD device, which may also include or be coupled with a mobile device, associated with an enclosure may then perform frame synch detection to verify that the particular data pattern matches an expected data pattern used to, in part, provide a level of security to the keyless entry based on distance ranging. This RTT-based ranging is susceptible to attack at least partially due to being able to be spoofed in two ways of measuring, including a ranging technique and a time-of-arrival (TOA) technique.

DETAILED DESCRIPTION

Figure 1A:
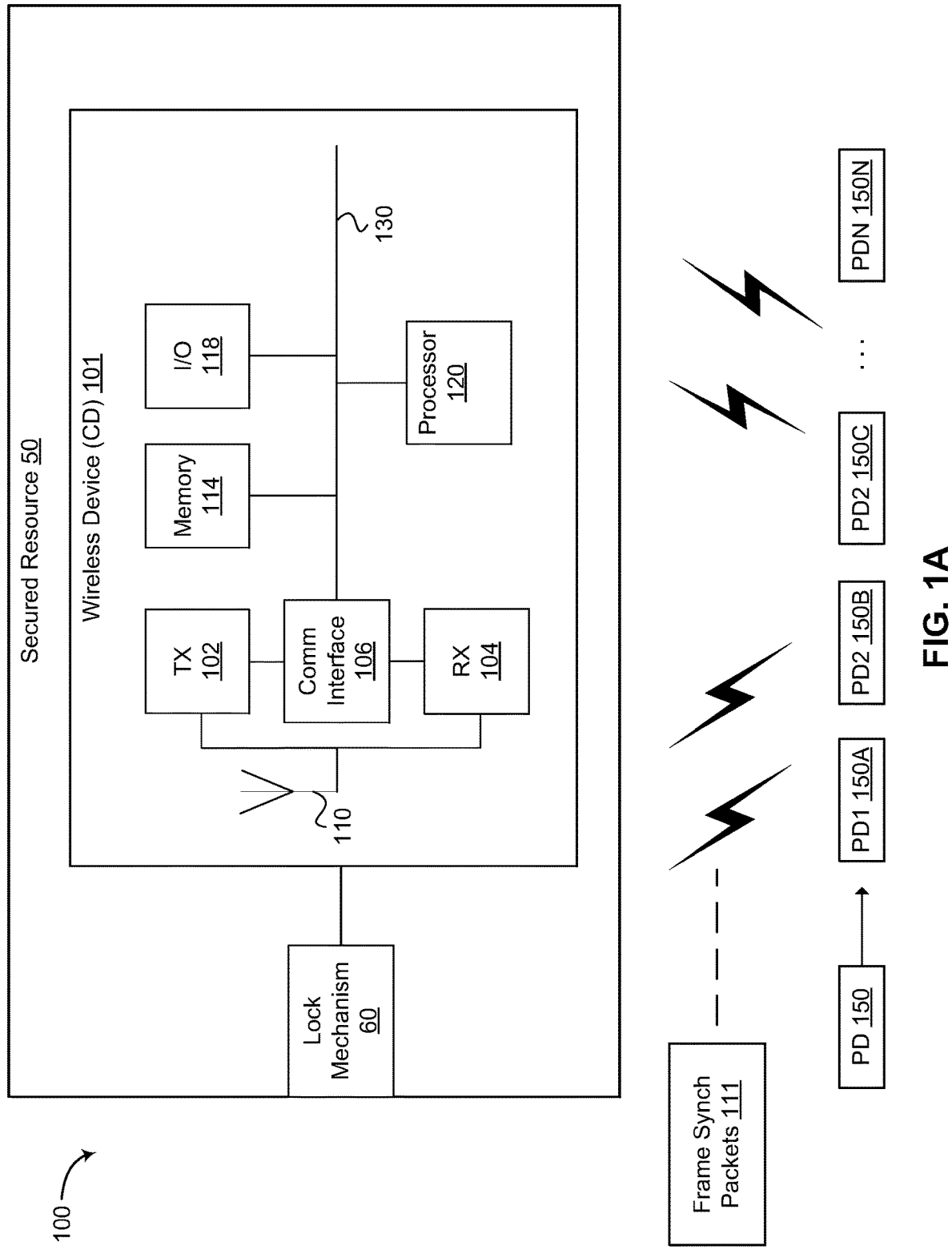
FIG. 1A is a block diagram of a system useable for BLE frame synch detection using a security signature according to an example embodiment.

The following description sets forth numerous specific details such as examples of specific systems, devices, components, methods, and so forth, in order to provide a good understanding of various embodiments of frame synch detection between wireless devices associated with a PAN. Frame synchronization (or frame synch) detection may be understood as detecting a frame delimiter, also referred to as a start frame delimiter (SFD), in a network packet that is identifying or signaling that data is to follow within a frame of the packet. While this is the case, some packets may include a frame delimiter (or SFD) without a payload (e.g., frame synch packets), particularly where the frame delimiter itself is initially employed for security purposes, e.g., in order to perform verification of a PD wireless device. Thus, the data of a packet referred to herein may refer to just a preamble and a frame delimiter or may also make reference to the frame or payload of data within the packet.

In certain PAN devices, frame synchronization detection can be used in order to aid in communication between wireless devices by identifying or signaling the data (i.e., payload data) that is to follow in a packet. Optionally, frame synchronization can also identify the sender of the packet. In certain PAN devices, frame synchronization can be used as part of BLE distance estimation, which was also previously known as BLE high accuracy distance measurement (HADM). BLE distance estimation is achieved through a phase-based distance ranging method, or through packet exchanges in round trip timing (RTT) estimation, or a combination thereof to provide localization between wireless devices. In one example, data patterns are used in RTT estimation to estimate the time of arrival (ToA) of a packet. In another example, BLE distance estimation can use the frequency estimated during the RTT estimation to synchronize the BLE distance estimation device to other BLE distance estimation devices through the correction of clocking errors and to estimate the phase during the phase ranging. Additionally, BLE distance estimation can use data patterns to estimate frequency for use in security features, such as intrusion detection models. As such, there is a need for a highly accurate frequency estimation in order to provide accurate phase distance ranging and localization services, as well as to improve security features for BLE distance estimation devices.

As discussed previously, RTT-based ranging technique employed for security can be spoofed and is thus susceptible to attack. For example, RTT-based ranging can be spoofed by an attacker (such as a man in the middle) using a method known as early detect late commit (EDLC). In this spoof, an attacker device guesses at each symbol of the data pattern bits as they are intercepted from the PD that is attempting to access an enclosure or resource secured by a CD. The attacker device then makes an early detection of the symbol, and if the guess was incorrect, changes the symbol before transmitting the symbol to the CD in time for the CD to still perform frame synch detection using the symbol. Upon the CD detecting a matching data pattern (along with other spoofed information checking out), the attacked device can gain access to the enclosure. Thus, an additional layer of security, such as a security signature that is difficult to spoof, is sought to ensure access to the enclosure is secured despite other spoofing techniques.

Accordingly, to resolve the security vulnerabilities associated with BLE distance estimation employing RTT-based ranging techniques, the present disclosure involves PD transmission devices and CD receiving devices, and related systems and methods, that add at least a security signature according to various embodiments. For example, in some embodiments, a wireless device (e.g., PD transmission device) includes transmission logic coupled to or integrated within a transmitter of the PD wireless device. This transmission logic is adapted to randomly generate a frequency offset based on bits within a frame synch packet to be transmitted during a keyless access attempt of an enclosure having a receiver. For example, the transmission logic can include Boolean logic to be performed on some or all of the bits in the frame synch packet. In these embodiments, the PD wireless device causes the bits of the frame synch packet to be encrypted with an encryption key. The transmission logic can then cause a frequency of the frame synch packet to be modified by the frequency offset before the transmitter transmits the frame synch packet to the receiver.

Further, according to various embodiments, the receiving device (or CD) is adapted to detect the frequency offset and confirm it as a security signature. More specifically, in some embodiments, receiving logic is at least one of coupled to or integrated within the receiver. This receiving logic can detect a frequency of a frame synch packet of the frame synch packets, identify bits of the frame synch packet, and generate the frequency offset based on the bits. The receiving logic can further estimate, to within a threshold accuracy level, the frequency of the frame synch packet includes the frequency offset. In some embodiments, this detection of the frequency offset is via synchronization of synch patterns that involves highly accurate frequency estimation. The receiving logic can then enable access, by the transmission device, to an enclosure (or resource) protected by the receiving device in response at least in part to the estimation. If the frequency estimation does not result in detecting a corresponding frequency offset, the receiving logic can deny access by the PD transmission device, to the enclosure.

In some embodiments, at least some of the receiving logic is located within a frequency detector that is sufficiently sensitive to detect a small frequency offset (relative to the frequency of the frame synch packet). Such detectors are generally not compatible with the low-cost and low-power nature of BLE devices. Thus, reference is made herein to BLE-based technology covered in a co-pending application that enables frame synch detection with very accurate frequency estimation, sufficient to detect a frequency offset of between 500 hertz (Hz) and 1.5 kHz or between −500 Hz and −1.5 kHz, for example, although similar ranges of low frequencies are envisioned and these ranges are provided for purposes of explanation only.

The present disclosure includes a number of advantages, including the ability to add additional aspects of security to distance estimations (e.g., the RTT-based ranging of BLE), which can be used to provide secure access to resources such as enclosures (e.g., a building or a vehicle), devices and/or device functionality, software, and any other resources to which any type of access or control is desired. Further, the security signature of the frequency offset is difficult to detect (e.g., by an attacker) without access to the unencrypted bits of the encrypted frame synch packet, making the security signature impossible to spoof without the key used to decrypt the data of the frame synch packet.

FIG. 1A is a block diagram of a system 100 useable for BLE frame synch detection using a security signature according to an example embodiment. In these embodiments, a wireless device 101 acts as a CD and may be referred to herein as a receiving device. Further, a wireless device 150 acts as a PD and may be referred to herein as a transmission device according to with an example embodiment. The system 100 can include a secured resource 50, e.g., that is secured using a lock mechanism 60, where the wireless device 150 is adapted to gain access to the secured resource 50 via the lock mechanism 60. The secured resource 50 can be, for example, an enclosure such as a vehicle, a building, a residence, a garage, a shed, a vault, or the like. The secured resource 50 can also be a computer system, industrial equipment, or other items requiring secured access via the lock mechanism 60, which can be a digital locking mechanism, for example. In some embodiments, the lock mechanism 60 is integrated together with the wireless device 101.

In various embodiments, the wireless device 150 is any one of multiple peripheral wireless devices PD1 150A . . . PDN 150N, as the wireless device 101 can be adapted to communicate with any or all of the peripheral wireless devices PD1 150A . . . PDN 150N. In differing embodiments, the wireless device 150 is a mobile device such as a mobile phone, a smart phone, a pager, an electronic transceiver, a tablet, or the like. In these embodiments, the wireless device 150 can be adapted to gain access to the secured resource 50 by transmitting data including a frame delimiter and an enclosed frame. In some embodiments, the frame is encapsulated in a frame synch packet, and one or more frame synch packets 111 can be transmitted from the wireless device 101 to the wireless device 150, as will be discussed in more detail. While the wireless device 101 is illustrated in detail, the wireless device 150 can also include the same or similar components as the wireless device 101, but and are not repeated for simplicity.

In at least some embodiments, the wireless device 101 includes, but is not be limited to, a transmitter 102 or TX (e.g., a PAN transmitter), a receiver 104 or RX (e.g., a PAN receiver), a communications interface 106, one or more antenna 110, a memory 114, one or more input/output (I/O) devices 118 (such as a display screen, a touch screen, a keypad, and the like), and a processor 120. These components can all be coupled to a communications bus 130.

In some embodiments, a separate antenna is employed for each of the transmitter 102 and receiver 104, and so the antenna 110 is illustrated for simplicity. In at least some embodiments, the memory 114 can include storage to store instructions executable by the processor 120 and/or data generated by the communication interface 106. In various embodiments, frontend components such as the transmitter 102, the receiver 104, the communication interface 106, and the one or more antenna 110 described herein within various devices may be adapted with or configured for PAN-based frequency bands, e.g., Bluetooth® (BT), BLE, Wi-Fi®, Zigbee®, Z-wave™, and the like.

In some embodiments, the communications interface 106 is integrated with the transmitter 102 and the receiver 104, e.g., as a frontend of the wireless device 101. The communication interface 106 may coordinate, as directed by the processor 120, to request/receive packets from the peripheral wireless device 150. The communications interface 106 can further process data symbols received by the receiver 104 in a way that the processor 120 can perform further processing, including verifying correlation between phase-based samples of data values obtained from a frame of a packet and an expected data pattern as part of a security protocol, as discussed herein.

Figure 1B:
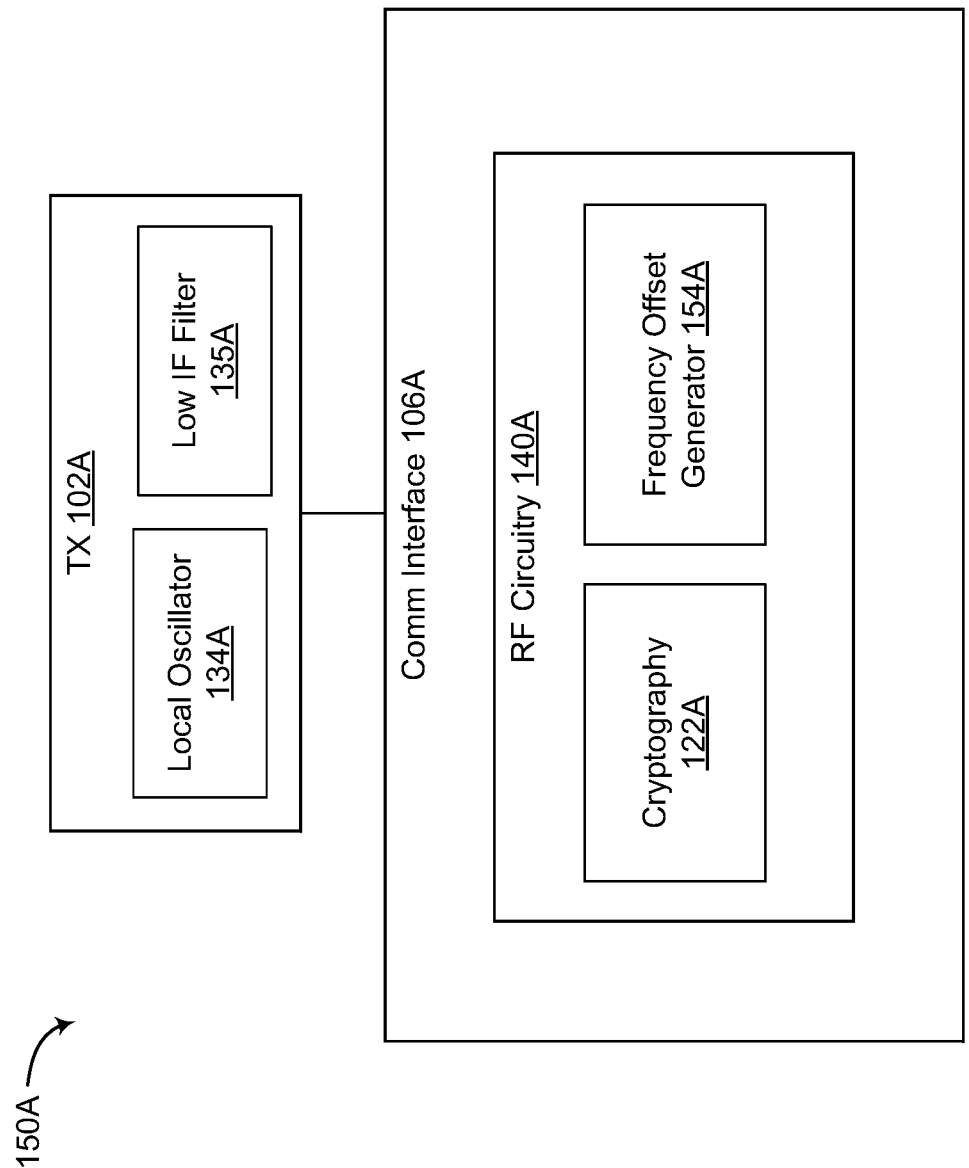
FIG. 1B is a simplified block diagram of the peripheral device (PD) (or a transmission device) of FIG. 1A according to at least one embodiment.

FIG. 1B is a simplified block diagram of the PD 150A (e.g., a transmission device) of FIG. 1A according to at least one embodiment. Recall that the components of the wireless device 101 of FIG. 1A can also be included in the PD devices 150A . . . 150N of FIG. 1A. Thus, the PD 150A can include a transmitter 102A and a communication interface 106A that are adapted with Bluetooth® low energy (BLE) distance estimation capability. In various embodiments, the transmitter 102A includes a local oscillator (LO) 134A to generate packets transmitted at a particular frequency that is associated with a channel. The communication interface 106A can direct the transmitter 102A to send out frame synch packets at the particular frequency in order to establish a secure wireless connection with the wireless device 101.

In these embodiments, the communication interface 106A includes RF circuitry 140A, which in turn includes logic such as cryptography logic 122A and a frequency offset generator 154A. In some embodiments, the logic of the RF circuitry 140A is at least one of coupled to or integrated within the transmitter 102A.

In at least one embodiment, the frequency offset generator 154A generates a frequency offset based on bits within a frame synch packet 111 to be transmitted during a keyless access attempt of the resource 50. The frequency offset generator 154A can use all of the bits of the frame synch packet or just a subset of the bits of the frame synch packet to generate the frequency offset. The cryptography logic 122A can further cause the bits of the frame synch packet to be encrypted with an encryption key. The frequency offset generator 154A or other logic of the RF circuitry 140A can then cause a frequency of the frame synch packet 111 to modified by the frequency offset before the transmitter 102A transmits the frame synch packet 111 to the receiver 104 of the wireless device 101 (or CD). In these embodiments, for the PD 150A to gain access to the secured resource 50, the frequency offset is detectable by the receiver 104 as a security signature, as will be discussed in more detail with reference to FIG. 1C.

In at least some embodiments, to randomly generate the frequency offset, the frequency offset generator 154A performs a Boolean operation on the bits of the frame synch packet 111. The frame synch packet 111 may include a random sequence or pattern of bits. This Boolean operation, in some embodiments, is an exclusive OR (XOR), although other Boolean or logical operations are envisioned. In these embodiments, the frequency offset generator 154A further identifies a predetermined negative or positive frequency offset based on a result of the Boolean operation. For example, the frequency offset can be one of between 500 hertz (Hz) and 1.5 kHz or between −500 Hz and −1.5 kHz depending on the result of the Boolean operation.

Figure 2:
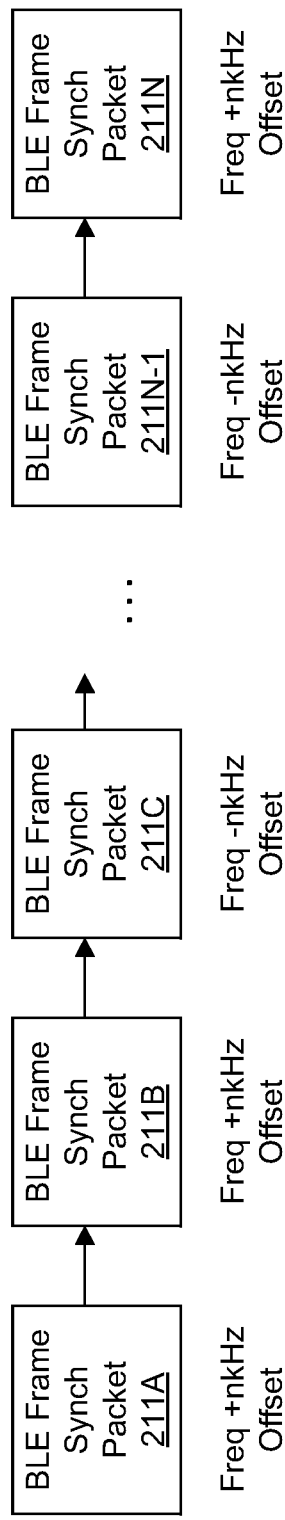
FIG. 2 is a block diagram of a series of BLE frame synch packets, each having a randomly-generated frequency offset, according to at least one embodiment.

With additional specificity, FIG. 2 is a block diagram of a series of BLE frame synch packets 211A . . . 211N, each having a randomly-generated frequency offset, according to at least one embodiment. For example, the BLE frame synch packets include a first frame synch packet 211A and a second frame synch packet 211B that each include a positive frequency offset (+nkHz). Further, a third frame synch packet includes a negative frequency offset (−nkHz), and so forth, where each frame synch packet of the series of BLE frame synch packets 211A . . . 211N includes positive or negative frequency offset that is detectable by transmitter 102 of the wireless device 101 (or CD). Thus, in these embodiments, the transmitter logic further causes the transmitter 102A to modify, with the frequency offset, a frequency of each of the series of frame synch packets transmitted to the receiver 104 of the wireless device 101 during a period of distance ranging between the transmitter 102A and the receiver 104.

In some embodiments, the transmitter 102A is one of a heterodyne or a superheterodyne transmitter. In these embodiments, the transmission logic (e.g., of the transmitter 102A and/or the RF circuitry 140A) causes the frequency offset to be applied to the frequency of the frame synch packet via a digital low intermediate frequency filter (e.g., a digital low IF filter 135A) of the transmitter 102A. In some embodiments, the RF circuitry 140A is implemented as a programmable processor, such as an application-specific integrated circuit (ASIC), field programmable gate array (FPGA), a processing unit (such as a CPU or a GPU), or other microprocessor device that can include a combination of circuit-based hardware, logic, firmware, and/or software.

Figure 1C:
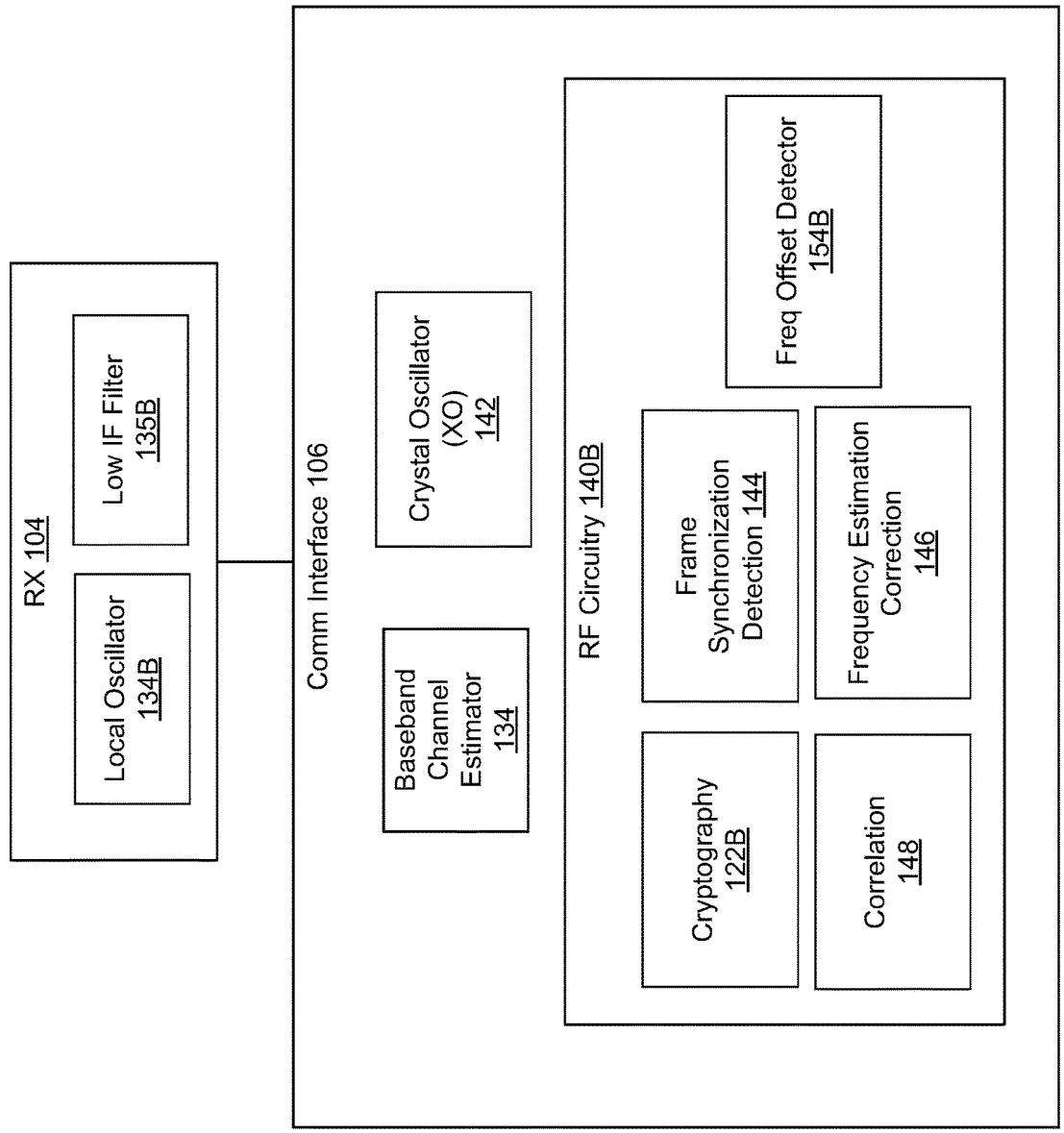
FIG. 1C is a simplified block diagram of the wireless device 101 (or central receiving device) of FIG. 1A according to at least one embodiment.

FIG. 1C is a simplified block diagram of the wireless device 101 (or CD receiving device) of FIG. 1A according to at least one embodiment. In at least some embodiments, the wireless device includes, as was discussed with reference to FIG. 1A, a receiver 104 and a communication interface 106. In these embodiments, the receiver 104 includes a local oscillator 134B used to discover channels of a PAN network and a digital low intermediate frequency filter, e.g., a digital low IF filter 135B. In these embodiments, the communication interface 106 includes a baseband channel estimator 134, a crystal oscillator (XO) 142, and RF circuitry 140B, which will be discussed in more detail. In these embodiments, the communication interface 106 aides the receiver 104 in having BLE capability to receive and process frame synch packets transmitted by the wireless device 150 (e.g., transmission device).

In at least some embodiments, the baseband channel estimator 134 used to estimate, and thus detect, a channel and enable the receiver 104 to receive packets over the channel. Estimating a channel can, for example, refer to estimating channel state information (CSI) and a received signal strength indicator (RSSI) for each channel. The CSI can include a detailed channel impulse response (e.g., containing channel properties) with both amplitude and phase information across Orthogonal Frequency Division Multiplexing (OFDM) subcarriers and be updated (at the maximum rate) every OFDM symbol. The receiver 104 can adjust the rate of sampling channel properties by the baseband channel estimator 134. Thus, the receiver 104 or the baseband channel estimator 134 can include the local oscillator 134B that samples at particular bit rates for particular channels.

In various embodiments, the XO 142 can be employed to generate a higher-frequency local clock that is sometimes employed in sampling the incoming data symbols to estimate frequency and phase of those data symbols, e.g., converting incoming data symbols into an XO domain at which the RF circuitry 140B can perform further processing of data packets. In at least some embodiments, the RF circuitry 140 includes (or is coupled with) the crystal oscillator (XO) 142 and the baseband channel estimator 134 and includes logic such as cryptographic logic 122B, a frame synchronization detection circuit 144, a frequency estimation correction circuit 146, a correlation circuit 148, and a frequency offset detector 154B. These components will be referred to in more detail after the description of FIG. 3.

In some embodiments, the RF circuitry 140B is implemented as a programmable processor, such as an application-specific integrated circuit (ASIC), field-programmable gate array (FPGA), a processing unit (such as a CPU or a GPU), or other microprocessor device that can include a combination of circuit-based hardware, logic, firmware, and/or software. In various embodiments, the RF circuitry 140 discussed herein can also be coupled with the communication interface 106 and thus be located elsewhere within the frontend of the wireless device 101.

Figure 3:
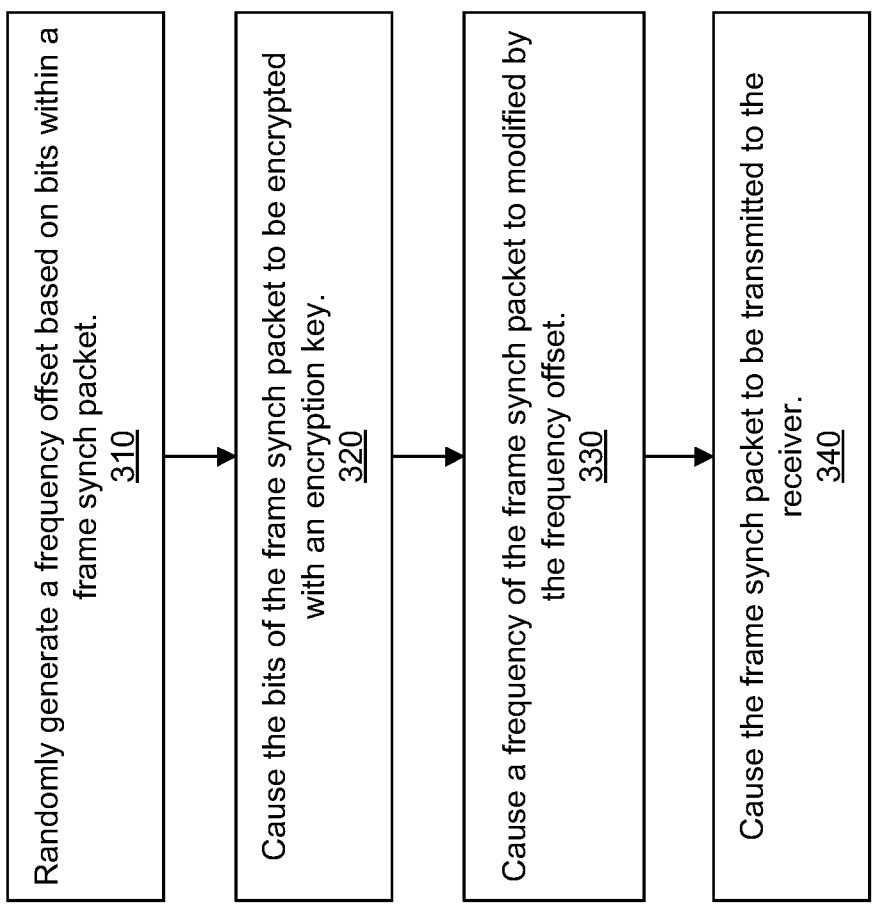
FIG. 3 is a flow diagram of a method of a PD transmission device securing BLE frame synch detection with a frequency signature according to various embodiments.

FIG. 3 is a flow diagram of a method 300 of a PD transmission device securing BLE frame synch detection with a frequency signature according to various embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the PD 150A, to include the communication interface 106A and the RF circuitry 140A.

At operation 310, the processing logic randomly generates a frequency offset based on bits within a frame synch packet to be transmitted during a keyless access attempt of a resource having a receiver.

At operation 320, the processing logic causes the bits of the frame synch packet to be encrypted with an encryption key.

At operation 330, the processing logic causes a frequency of the frame synch packet to modified by the frequency offset.

At operation 340, the processing logic causes the frame synch packet to be transmitted to the receiver.

With additional reference to FIG. 1C, frame synchronization detection (e.g., performed by the frame synchronization detection circuit 144) can be carried out at a sample rate that is a simple multiple (e.g., 4, 6, 8, 12 megahertz (MHz)) of the data symbol rate (e.g., 1 or 2 megabits per second (Mbps)). The sample rate and the data symbol rate are typically a divided (e.g., sampling) rate of the crystal oscillator (XO) frequency (e.g., 24, 32, or 48 MHz). The subsequent processing of the data symbols can be straightforward in being performed at known XO-divided sample rates, and synchronization data patterns (e.g., digital "0s" and "1s") can be more easily correlated using bit decisions according to Boolean logic. Alternatively, signed soft symbols can be used to obtain more accurate results, in which case the correlation can be described as a number of summations and subtractions. Some deficiencies in these approaches include that receivers that operate at XO-divided sample rates can experience significant radio interference issues, e.g., in the form of disturbances, spurs, and/or noise that cause receiver de-sensing, e.g., impacts receiver sensitization. In BLE devices and other PAN devices that implement ranging and localization services, as well as security features, these radio interference issues are avoided by determining a more accurate frequency estimation from frame synchronization.

In at least some embodiments, the frame synchronization detection circuit 144 of FIG. 1C is configured to identify a frame synchronization pattern at a portion of a packet received via the receiver 104. The frame synchronization pattern can be a set of bits that include a pre-known data pattern that indicates or identifies that data is to follow within the frame of the packet. The correlation circuit 148 can be configured to compute a frequency offset using the data samples from the received packet. The frequency offset can be computed using a correlation method, as described herein with respect to FIGS. 5-6. The frequency estimation correction circuit 146 can be configured to determine one or more bias values in the identified frame synchronization pattern, as described herein with respect to FIGS. 7A-7B. The frequency estimation correction circuit 146 can further adjust the computed frequency offset using a mathematical correction equation that applies the one or more determined bias values to the computed frequency offset to account for biases in the frame synchronization pattern that affects the frequency, as described herein.

Figure 4:
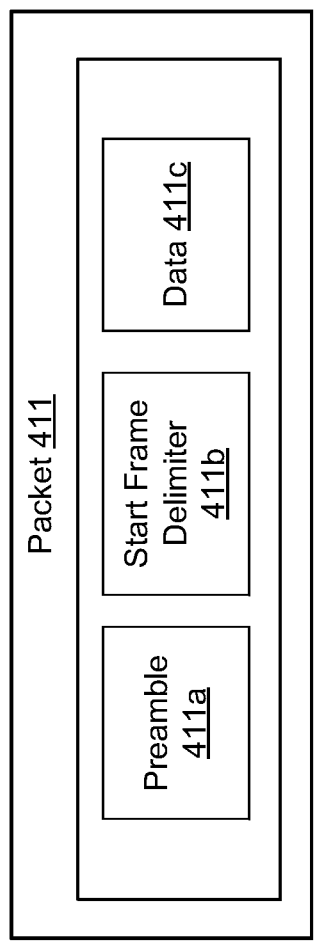
FIG. 4 is a simplified block diagram illustrating a packet received from a wireless device, in accordance with some implementations.

FIG. 4 is a simplified block diagram illustrating a packet 411 received from a wireless device (e.g., the PD 150 in FIG. 1A), in accordance with some implementations. As illustrated in FIG. 4, the packet 411 can include, but is not limited to, a preamble 411a, a start frame delimiter 411b, and data 411c. The preamble 411a is typically a fixed number of bytes (e.g., seven bytes) that indicate or identify that data is to follow within a frame of a packet received by a receiver (e.g., the receiver 104 of FIG. 1A). The preamble 411a allows wireless devices (e.g., the wireless device 101 of FIG. 1A) to synchronize their receiver clocks with the transmitter clocks of wireless devices (e.g., the PD 150 in FIG. 1A). The start frame delimiter 411B is typically another fixed number of bytes (e.g., one byte) that indicates the end of the preamble 411a and the start of the frame with payload data (e.g., the data 411c).

Figure 5:
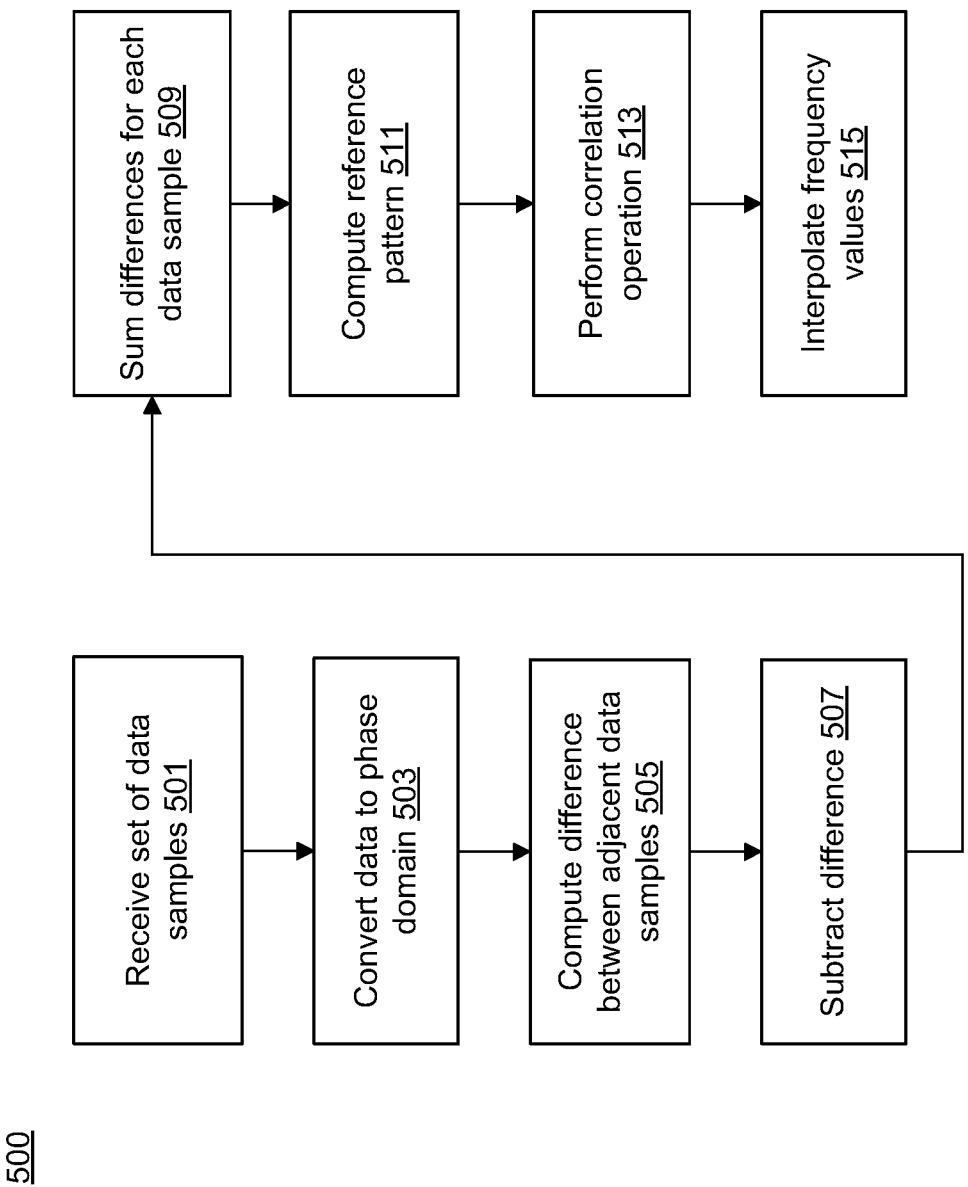
FIG. 5 is a flow diagram of an example method for estimating a frequency offset, in accordance with some implementations.

FIG. 5 is a flow diagram of an example method 500 for estimating a frequency offset, in accordance with some implementations. The method 500 may be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the communication interface 106 and/or the processor 120 of the wireless device 101 (e.g., as illustrated in FIGS. 1A-1B).

At operation 501, n data samples of a packet (e.g., the packet 111 of FIG. 4) are received via a receiver (e.g., the receiver 104 of FIG. 1A) from a wireless device (e.g., the PD 150 of FIG. 1A). The data can be sampled at an integer rate (k) of a local oscillator (LO) bit rate. For example, the data can be sampled at a rate that is a simple multiple (e.g., 4, 6, 8, 12 MHz) of the data symbol rate (e.g., 1 or 2 Mbps), where the rates are a divided rate of the crystal oscillator (XO) frequency (e.g., at 24, 32, or 48 MHz).

The data samples can be used in order to obtain frequency estimation samples dS(n), i.e., the differential of the n data samples over one symbol S. For example, in some embodiments, at operation 503, the data samples of the packet are converted into the in-phase domain (e.g., using φ(n)). At operation 505, the difference between adjacent data samples can be computed. In some embodiments, computing the difference between adjacent samples is performed by calculating the differential of adjacent phase domain data sample values. For example, the difference can be computed using a mathematical equation that may be:

$$d\varphi(n)=\varphi(n)-\varphi(n-1).$$

At operation 507, for each difference between adjacent samples computed at operation 505, the difference a symbol away from each sample can be subtracted. For example, the difference a symbol away can be subtracted using a mathematical equation that may be:

$$dS\varphi(n) = \frac{d\varphi(n) - d\varphi(n-k)}{k}.$$

At operation 509, the differences for each data sample can be accumulated (e.g., summed up) in order to obtain the frequency estimation samples dS(n). In some embodiments, the differences are further scaled, using a value such as π (i.e., pi) and a modulation index (e.g., a fixed value such as 0.5). For example, the differences can be accumulated and scaled to obtain dS(n) using a mathematical equation that may be:

$$dS(n)=\pi h \Sigma_{k=1}^{n} dS\varphi(k).$$

At operation 511, a reference frame synchronization pattern can be computed. In some embodiments, the reference frame synchronization pattern is a pattern that is to be used in a correlation operation. When the reference frame synchronization pattern matches a portion of the received data, the correlation operation generates a peak (in magnitude). The reference frame synchronization pattern can be computed, for example, using a mathematical equation that may be:

$$\text{Ref}(n)=\pi h(2\vartheta(n)-1).$$

In the mathematical equation above, $\vartheta(n)$ can be predetermined synchronization symbols that are found in BLE distance estimation devices.

At operation 513, a correlation operation can be performed in order to obtain a peak in the correlation and one or more values before and after the peak (e.g., to generate fractional timing correctional values to the peak). In some embodiments, the correlation operation is performed using a mathematical equation using the computed reference frame synchronization pattern and the computed frequency estimation samples dS(n) to compute a peak value. For example, the mathematical equation may be:

$$\text{Corr}(n)=\Sigma_{i=1}^{i=32} S(n-i*k)\text{Ref}(i),$$

where k is the data oversampling ratio used in the receiver.

The phase of the computed peak value (which is a peak of the magnitude of the correlation) is a first estimate of the frequency offset value. However, the first estimate of the frequency offset value can often be inaccurate (e.g., the timing of the peak is inaccurate). To improve the first estimate of the frequency offset value (e.g., to improve the timing of the peak), the one or more values before and after the peak can also be computed, where, the one or more values are each a fractional timing correctional value of the computed peak value (e.g., +/−0.25, +/−0.5, etc.).

At operation 515, using the peak value in addition to the one or more values before and after the peak, an improved second estimate of the frequency offset value can be computed. Computing the second estimate of the frequency offset value can include performing a linear interpolation of the phase of the peak value and the phase of the one or more values before and/or after the peak. In some embodiments, a conventional linear interpolation mathematical method is used. In some embodiments, the linear interpolation can be performed using a parabolic fit function or other fit function. For example, with respect to parabolic fits, a stationary point of the parabola can be computed, e.g., the point where the derivative of the parabola is zero.

In some embodiments, the first estimate of the frequency offset value (e.g., the peak value) and the second estimate of the frequency offset value (e.g., the linear interpolation of the computed values between and after the peak and the peak value) are used to compute a further improved third estimate of the frequency offset value. As described herein, the first and/or second estimates of frequency offset values can be inaccurate since certain biases in the frame synchronization pattern, which have not been accounted for, affect the frequency offset values. The first and/or second estimate of the frequency offset value can thus be improved by using bias values that correct for biases, as described herein with respect to FIG. 7A.

It should be understood that the above mathematical equations are intended as examples and that various other schemes of estimating frequency values are possible, e.g., using different specific equations, accounting for different (or additional) corrections, while still being within the scope of this disclosure.

Figure 6:
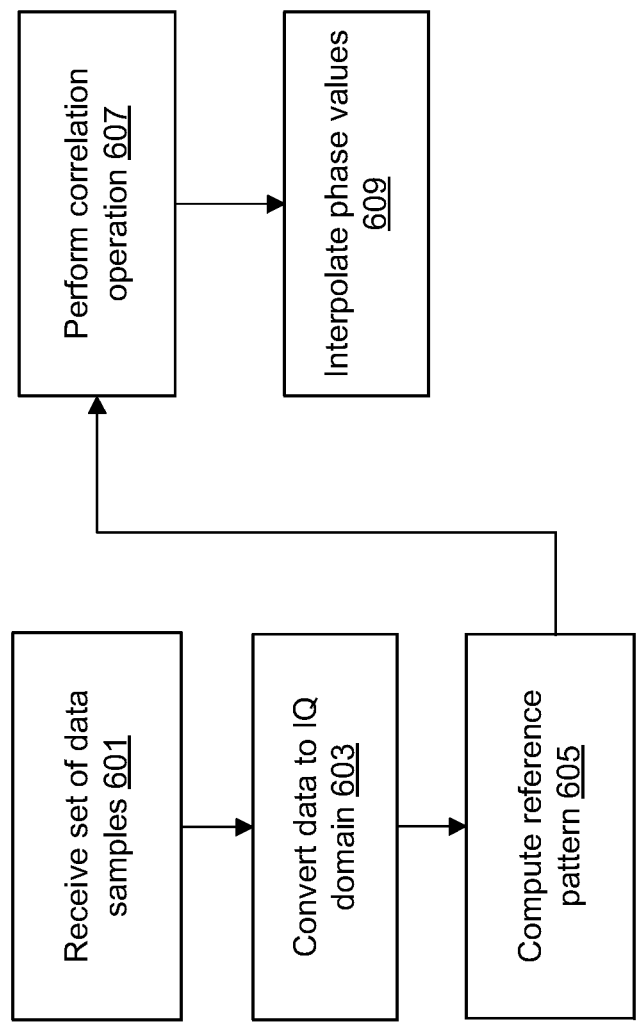
FIG. 6 is a flow diagram of an example method for estimating a frequency offset, in accordance with some implementations.

FIG. 6 is a flow diagram of an example method 600 for estimating a frequency offset, in accordance with some implementations. The method 600 may be performed by processing logic that can include firmware, hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the communication interface 106 and/or the processor 120 of the wireless device 101 (e.g., as illustrated in FIGS. 1A-1B).

At operation 601, n data samples of a packet (e.g., the packet 111 of FIG. 4) are received via a receiver (e.g., the receiver 104 of FIG. 1A) from a wireless device (e.g., the PD 150 of FIG. 1A). The data can be sampled at an integer rate (k) of a local oscillator (LO) bit rate. For example, the data can be sampled at a rate that is a simple multiple (e.g., 4, 6, 8, 12 MHz) of the data symbol rate (e.g., 1 or 2 Mbps), where the rates are a divided rate of the crystal oscillator (XO) frequency (e.g., at 24, 32, or 48 MHz).

The data samples can be used in order to obtain frequency estimation samples dS(n), i.e., the differential of the n data samples over one symbol S. For example, in some embodiments, at operation 603, the data samples of the packet are converted into an in-phase and quadrature (IQ) domain. For example, the data samples dS(n) can be converted to the IQ domain using a mathematical equation that may be:

$$dIQ(n)=e^{jDS(n)}.$$

At operation 605, a reference frame synchronization pattern can be computed. In some embodiments, the reference frame synchronization pattern is a pattern that is to be used in a correlation operation. When the reference frame synchronization pattern matches a portion of the received data, the correlation operation generates a peak (in its magnitude). The reference frame synchronization pattern can be computed, for example, using a mathematical equation that may be:

$$\text{Ref}(n)=e^{-j\pi h(2\vartheta(n)-1)}.$$

In the mathematical equation above, $\vartheta(n)$ can be predetermined synchronization symbols that are found in BLE distance estimation devices.

At operation 607, a correlation operation can be performed in order to obtain a peak in the correlation and one or more values before and after the peak (e.g., to generate fractional timing correctional values to the peak). In some embodiments, the correlation operation is performed using a mathematical equation using the computed reference frame synchronization pattern and the computed frequency estimation samples dIQ(n) to compute a peak value. For example, the mathematical equation may be:

$$\text{Corr}(n) = \Sigma_{i=1}^{i=32} d\text{IQ}(n-i*k)\text{Ref}(i),$$

where k is the data oversampling ratio used in the receiver.

The computed peak value is a first estimate of the frequency offset value. However, the first estimate of the frequency offset value can often be inaccurate (e.g., the timing of the peak is inaccurate). To improve the first estimate of the frequency offset value (e.g., to improve the timing of the peak), the one or more values before and after the peak can also be computed, where the one or more values are each a fractional timing correctional value of the computed peak value (e.g., +/−0.25, +/−0.5, etc.).

At operation 609, using the peak ρ(n) value in addition to the one or more values before and after the peak, an improved second estimate of the frequency offset value can be computed (in order to, e.g., correct the timing of the first estimate of the frequency offset value Kφ(n) described at operation 607). Computing the second estimate of the frequency offset value can include performing a linear interpolation of the phase of the peak value and the phase of the one or more values before and/or after the peak. In some embodiments, a conventional linear interpolation mathematical method is used. In some embodiments, the linear interpolation can be performed using a parabolic fit function or other fit function. For example, with respect to parabolic fits, a stationary point of the parabola can be computed, e.g., the point where the derivative of the parabola is zero. In some embodiments, each computed value (e.g., the peak ρ(n) value and the one or more values before and after the peak ρ(n) value) are converted to polar notation, $\rho(n)e^{i\varphi(n)}$, where φ(n) is an estimate of the frequency offset in phase measurement units. In some embodiments, Kφ(n) is a first (i.e., initial) estimate of the frequency, where K is a known conversion factor, such as 5e5/π. The computed values can be converted to polar notation using a mathematical equation that may be:

$$\rho(n)e^{i\varphi(n)} = \text{Corr}(n).$$

In some embodiments, the first estimate of the frequency offset value (e.g., the peak ρ(n) value) and the second estimate of the frequency offset value (e.g., the linear interpolation of the computed values between and after the peak ρ(n) value and the peak ρ(n) value) are used to compute a further improved third estimate of the frequency offset value. As described herein, the first and/or second estimates of frequency offset values can be inaccurate since certain biases in the frame synchronization pattern, which have not been accounted for, affect the frequency offset values. The first and/or second estimate of the frequency offset value can thus be improved by using bias values that correct for biases, as described herein with respect to FIG. 7A.

It should be understood that the above mathematical equations are intended as examples and that various other schemes of estimating frequency values are possible, e.g., using different specific equations, accounting for different (or additional) corrections, while still being within the scope of this disclosure.

Figure 7A:
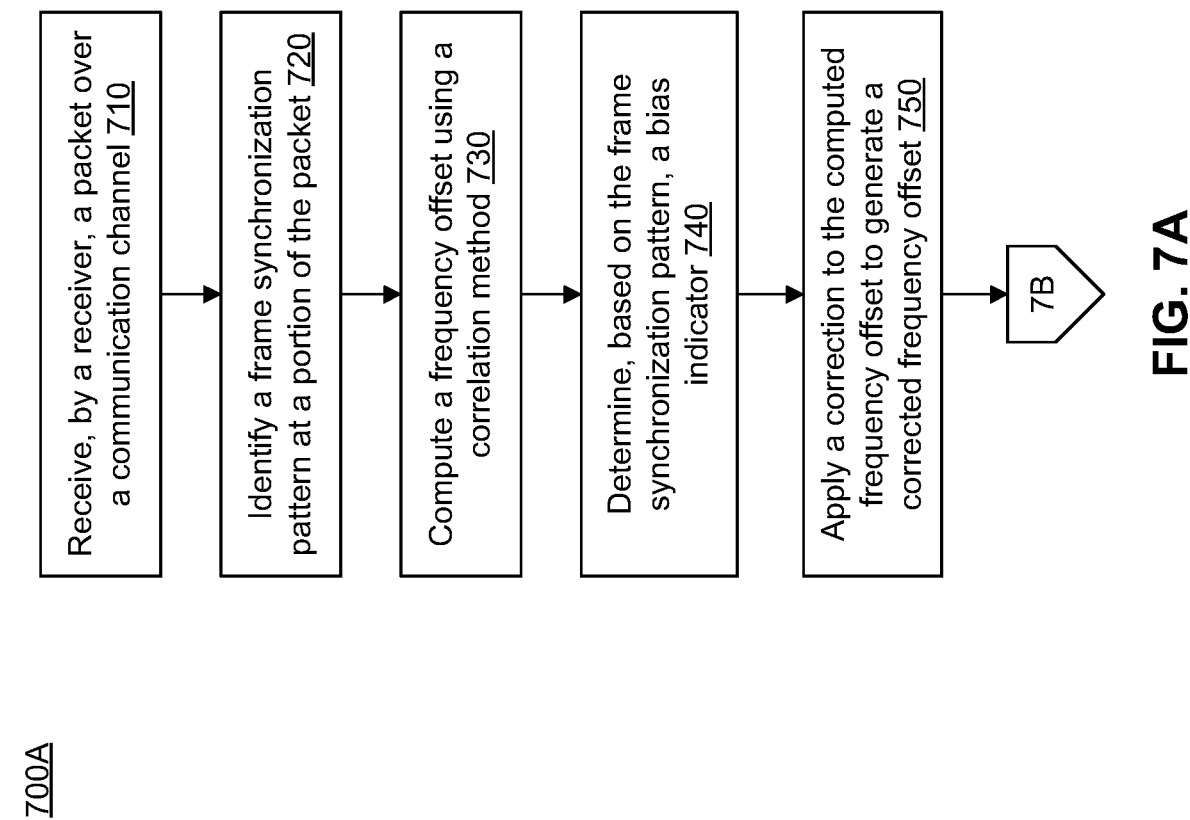
FIG. 7A is a flow diagram of an example method for frame synchronization detection with frequency estimation, in accordance with some implementations.

FIG. 7A is a flow diagram of an example method 700A for frame synchronization detection with frequency estimation, in accordance with some implementations. The method 700A may be performed by processing logic that can include firmware, hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700A is performed by the communication interface 106 and/or the processor 120 of the wireless device 101 (e.g., as illustrated in FIGS. 1A-1B).

At operation 710, the processing logic receives a packet. The packet can be received via a receiver (e.g., the receiver 104 of FIG. 1A). In some embodiments, the packet is be the packet 111 of FIG. 1A and/or FIG. 4. The packet can include a preamble, a start frame delimiter, and payload data, as described herein.

At operation 720, the processing logic identifies a frame synchronization pattern. The frame synchronization pattern can be identified at a portion of the packet 411. In some embodiments, the frame synchronization pattern is a sequence of bits from the preamble 411a and/or start frame delimiter 411b portions of the packet. Identifying the frame synchronization pattern can include identifying a pre-known data pattern within the portion of the packet. The pre-known data pattern can be a set of bits in the sequence of bits from the preamble 411a, the start frame delimiter 411b portions of the packet, and/or a set of known symbols in a payload portion of the packet.

At operation 730, the processing logic computes a frequency offset. In some embodiments, the processing logic computes the frequency offset using a correlation method. For example, the processing logic can compute the frequency offset using the correlation method described with respect to FIG. 6. In some examples, the processing logic can compute the frequency offset using the correlation method described with respect to FIG. 7A. In some examples, the processing logic can compute the frequency offset using other methods of correlation not specifically described herein or known at the present time.

At operation 740, the processing logic determines a bias value. In some embodiments, the processing logic determines the bias value based on the identified frame synchronization pattern. The bias value can reflect a particular data pattern within the identified frame synchronization pattern that is indicative of a frequency bias. In certain wireless devices, certain types of data patterns within the frame synchronization pattern can indicate frequency bias within the packet. In some embodiments, the data patterns includes none, one, or more singleton patterns. The singleton pattern is a number of singleton zeros and/or singleton ones within the frame synchronization pattern (e.g., any isolated 0s or 1s in a sequence of bits, such as the following bolded 0s and 1s: "0 1 0 0 1 0 0 0"). In some embodiments, the data patterns includes one or more transition patterns. The transition pattern is a number of transition zeros and/or transition ones within the frame synchronization pattern (e.g., any transition 0s and 1s in a sequence of bits, such as the following bolded 0s and 1s: "0 1 0 0 1 0 0 0 0"). In some embodiments, the data patterns includes none or more non-transition patterns. The non-transition pattern is a number of non-transition zeros and/or non-transition ones within the frame synchronization pattern (e.g., any non-transition 0s and 1s in a sequence of bits, such as the following bolded 0s and 1s: "0 1 0 0 1 0 0 0 0").

In some embodiments, the processing logic detects, starting at an initial bit of the frame synchronization pattern and ending at a final bit of the frame synchronization pattern, none, one or more isolated 0 bits (e.g., singleton zeros). The processing logic can assign a fixed integer or non-integer value (e.g., 1) to each isolated 0 bit. The processing logic can compute the sum of each of the fixed values assigned to each isolated 0 bit. The processing logic can store the sum in a data structure stored in or otherwise accessible by the wireless device (e.g., residing in memory 114 illustrated in FIG. 1A). In some embodiments, the sum of the one or more isolated 0 bits can be referred herein as $S(1,1)$.

In some embodiments, the processing logic detects, starting at the initial bit of the frame synchronization pattern and ending at a final bit of the frame synchronization pattern, none, one or more isolated 1 bits (e.g., singleton ones). The processing logic can assign a fixed integer or non-integer value (e.g., 1) to each isolated 1 bit. The processing logic can compute the sum of each of the fixed values assigned to each isolated 1 bit. The processing logic can store the sum in a data structure stored in or otherwise accessible by the wireless device (e.g., residing in memory 114 illustrated in FIG. 1A). In some embodiments, the sum of the one or more isolated 1 bits can be referred herein as $S(1,2)$.

In some embodiments, the processing logic detects, starting at the initial bit of the frame synchronization pattern and ending at a final bit of the frame synchronization pattern, one or more transition zeros. The processing logic can assign a fixed integer or non-integer value (e.g., 1) to each transition zero. The processing logic can compute the sum of each of the fixed values assigned to each transition zero. The processing logic can store the sum in a data structure stored in or otherwise accessible by the wireless device (e.g., residing in memory 114 illustrated in FIG. 1A). In some embodiments, the sum of the one or more transition zeros can be referred herein as $S(2,1)$.

In some embodiments, the processing logic detects, starting at the initial bit of the frame synchronization pattern and ending at a final bit of the frame synchronization pattern, one or more transition ones. The processing logic can assign a fixed integer or non-integer value (e.g., 1) to each transition one. The processing logic can compute the sum of each of the fixed values assigned to each transition one. The processing logic can store the sum in a data structure stored in or otherwise accessible by the wireless device (e.g., residing in memory 114 illustrated in FIG. 1A). In some embodiments, the sum of the one or more transition ones can be referred herein as $S(2,2)$.

In some embodiments, the processing logic detects, starting at the initial bit of the frame synchronization pattern and ending at a final bit of the frame synchronization pattern, none, one or more non-transition zeros. The processing logic can assign a fixed integer or non-integer value (e.g., 1) to each non-transition zero. The processing logic can compute the sum of each of the fixed values assigned to each non-transition zero. The processing logic can store the sum in a data structure stored in or otherwise accessible by the wireless device (e.g., residing in memory 114 illustrated in FIG. 1A). In some embodiments, the sum of the one or more non-transition zeros can be referred herein as $S(3,1)$.

In some embodiments, the processing logic detects, starting at the initial bit of the frame synchronization pattern and ending at a final bit of the frame synchronization pattern, none, one or more non-transition ones. The processing logic can assign a fixed integer or non-integer value (e.g., 1) to each non-transition one. The processing logic can compute the sum of each of the fixed values assigned to each non-transition one. The processing logic can store the sum in a data structure stored in or otherwise accessible by the wireless device (e.g., residing in memory 114 illustrated in FIG. 1A). In some embodiments, the sum of the one or more non-transition ones can be referred herein as $S(3,2)$.

In some embodiments, the processing logic can detect other data patterns within the frame synchronization pattern that are indicative of frequency bias. The processing logic can determine the number of detected one or more other data patterns (e.g., by maintaining a count of each of the one or more data patterns). The processing logic can store the number of detected one or more data patterns in a data structure stored in or otherwise accessible by the wireless device (e.g., residing in memory 114 illustrated in FIG. 1A), such as in a similar method as described above with respect to the singleton, transition, and/or non-transition patterns, or with any other applicable method.

In some embodiments, the bias value determined by the processing logic is each of the detected one or more data patterns (e.g., singleton, transition, non-transition, etc.) as described herein.

In some embodiments, the processing logic does not identify a data pattern indicative of a frequency bias within the frame synchronization pattern. In response to not identifying a data pattern indicative of a frequency bias, the processing logic can use the computed frequency offset (at operation 730) as the frequency without applying a correction as described herein with respect to operation 750.

At operation 750, the processing logic applies a correction to the computed frequency offset (operation 730) based on the frequency bias (corresponding to the particular data pattern determined at operation 740) to generated a corrected frequency offset of the packet, and thus correct a frequency of the packet. In some embodiments, the processing logic assigns (e.g., multiply) a weighted value k (e.g., a fixed integer or non-integer value) to each bias value of a unique data pattern, i.e., a weighted value $k_1$ is assigned to the bias value for singleton patterns, a weighted value $k_2$ is assigned to the bias value bias value for transition patterns, and a weighted value $k_3$ is assigned to the bias value for non-transition patterns. In some embodiments, the processing logic uses a mathematical equation to estimate the correlation peak, such as:

$$\text{CorrPeak}=S(1,2)e^{jk_1}+S(1,1)e^{-jk_1}+S(2,2)e^{jk_2}+S(2,1)e^{-jk_2}+S(3,2)e^{jk_3}+S(3,1)e^{-jk_3}.$$

And from such estimate, a bias correction can be computed using a mathematical equation, such as:

$$\text{BiasCorrection}=\text{angle}(\text{CorrPeak})$$

In the above mathematical equation, the value $S(1,2)$ is the determined bias value for singleton patterns of 1 bits; the value $S(1,1)$ is the determined bias value for singleton patterns of 0 bits; the value $S(2,2)$ is the determined bias value for transition patterns of 1 bits; the value $S(2,1)$ is the determined bias value for transition patterns of 0 bits; the value $S(3,2)$ is the determined bias value for non-transition patterns of 1 bits; and the value $S(3,1)$ is the determined bias value for non-transition patterns of 0 bits. In some embodiments, there are other values not reflected in the above-described mathematical equation that can reflect determined bias values for other data patterns not described herein. For example, there can be a weighted value $k_4$ assigned to a bias value, a weighted value $k_5$ assigned to another bias value, etc.

In some embodiments, the processing logic can use another mathematical equation to compute an estimate of the bias value, such as:

$$\text{BiasCorrection}=l_1(S(1,2)-S(1,1))+l_2(S(2,2)-S(2,1))+l_3(S(3,2)-S(3,1)).$$

In the above mathematical equation, $l_1$, $l_2$, and $l_3$ are estimated empirically based on offline testing and can be predetermined/preconfigured values. Each of the values S(1,2), S(1,1), S(2,2), S(2,1), S(3,2), and S(3,1) can be computed in a similar method as described herein above. In some embodiments, the processing logic removes (e.g., subtracts) the correction from the computed correlation peak to compute a corrected frequency value using the frequency offset Freq computed at operation 730 and a unit conversion factor, K. In some embodiments, such as with BLE, the unit conversion factor (to Hz) is 500.000/π. In some embodiments, the mathematical equation to remove (e.g., subtract) the correction to the computed correlation peak to compute the corrected frequency value is:

$$\overline{Freq} = K(\varphi - BiasCorrection).$$

Figure 7B:
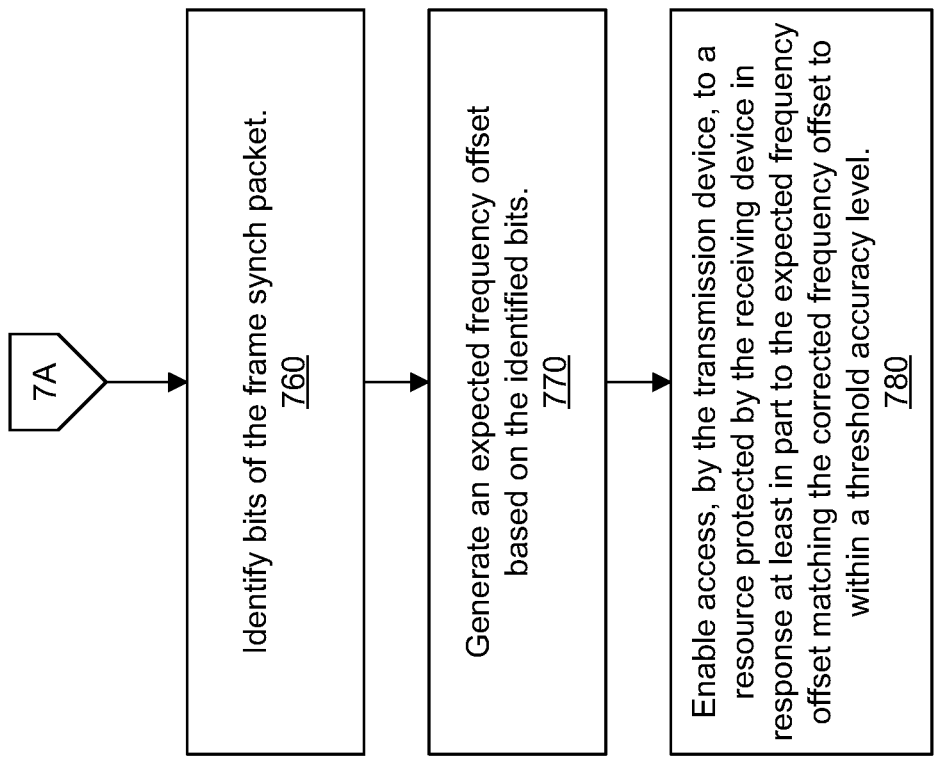
FIG. 7B is a flow diagram of a method of a CD receiving device securing BLE frame synch detection with a frequency signature according to various embodiments.

FIG. 7B is a flow diagram of a method 700B of a CD receiving device securing BLE frame synch detection with a frequency signature according to various embodiments. The method 700B, which can be understood as an extension to the method 700A of FIG. 7A, can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700B is performed by wireless device 101 (or CD), to include the communication interface 106 and potentially by a combination of the communication interface 106 and the processor 120.

At operation 760, the processing logic identifies bits of the frame synch packet, which in one embodiment, are the bits that were encrypted and transmitted by the wireless device, as discussed with reference to FIG. 3.

At operation 770, the processing logic generates an expected frequency offset based on the identified bits, e.g., which may be the identified encrypted bits. In these embodiments, the RF circuitry 140B (e.g., the frequency offset detector 154B) generates an expected frequency offset based on the identified bits. In some embodiments, the identified bits include all or a subset of the bits of the frame synch packet, e.g., based on the encrypted bits. As performed by the RF circuitry 140A, to generate the frequency offset, the frequency offset detector 154B can perform a Boolean operation on the identified bits and identify a predetermined negative or positive frequency offset based on a result of the Boolean operation. In some embodiments, the Boolean operation is an exclusive OR (XOR), although other Boolean operations are envisioned. In at least some embodiments, the frequency offset being one of between 500 hertz (Hz) and 1.5 kHz or between −500 Hz and −1.5 kHz.

At operation 780, the processing logic enables access, by the transmission device, to a resource protected by the receiving device in response at least in part to the expected frequency offset matching the corrected frequency offset to within a threshold accuracy level. For example, the resource may be the secured enclosure 50. The threshold level of accuracy may be determined through a peak detection algorithm or process, for example.

In at least some alternative embodiments, the RF circuitry 140 (e.g., the frequency offset detector 154B) is further adapted to estimate frequency offsets by way of averaging a detected frequency offset of a series of frame synch packets. More specifically, the RF circuitry 140 can generate a set of corrected frequency offsets, each corrected frequency offset associated with each frame synch packet of a series of frame synch packets received during distance ranging. The RF circuitry 140 can further average frequency offsets of the set of corrected frequency offsets. The RF circuitry 140 can further estimate, to within the threshold accuracy level, that a frequency of at least one of the series of frame synch packets includes the average frequency offset. In another embodiment, the RF circuitry 140 ensures that each frequency offset detected within the series of frame synch packets is within a predetermined threshold value of the average frequency offset. In this way, averaging detected frequency offset makes the use of this security signature more reliable and less likely to lead to false positives or false negatives over time.

In at least one embodiment, the receiver 104 is one of a heterodyne or a superheterodyne receiver. In this at least one embodiment, the receiving logic (e.g., of the receiver 104 and/or the RF circuitry 140), to estimate that a frequency of the frame synch packet includes the frequency offset, causes the frame packet to be filtered by the digital low IF filter 135B of the receiver 104.

In various embodiments, to provide the accuracy requires to estimate, within the threshold accuracy level, that the frequency of any given frame synch packet includes a particular frequency offset, the frame synchronization detector 144, correlation circuit 148, and frequency estimation corrector 146 can be employed in combination to detect and correct for a small frequency bias in the frequency of a frame synch packet. In performing this detection and correction, the RF circuitry 140 is able to detect a small frequency offset to which can be compared to an expected frequency offset generated by logical processing of the identified bits of the frame synch packet.

FIG. 5-7B are not intended to limit the methods described therein to certain combinations, permutations, or assignment of actors, i.e., whether a PD or CD actually performs a particular operation. Rather, they are meant to be indicative of some implementations of this disclosure, and one skilled in the art will recognize that some operations may be rearranged for particular applications, some operations need not always be performed, some operations may be omitted, etc.

It will be apparent to one skilled in the art that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein.

The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C/PD mode-transition architecture described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the disclosure has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A wireless device comprising:
   a transmitter adapted with Bluetooth® low energy (BLE) capability; and
   transmission logic at least one of coupled to or integrated within the transmitter, the transmission logic to:
   randomly generate a frequency offset based on bits within a frame synch packet to be transmitted during a keyless access attempt of an enclosure having a receiver;
   cause the bits of the frame synch packet to be encrypted with an encryption key; and
   cause a frequency of the frame synch packet to be modified by the frequency offset before the transmitter transmits the frame synch packet to the receiver, wherein, to gain access to the enclosure, the frequency offset is detectable within the frequency by the receiver as a security signature.

2. The wireless device of claim 1, wherein the bits comprise all bits of the frame synch packet.

3. The wireless device of claim 1, wherein, to randomly generate the frequency offset, the transmission logic is to:
   perform a Boolean operation on the bits; and
   identify a predetermined negative or positive frequency offset based on a result of the Boolean operation, the frequency offset being one of between 500 hertz (Hz) and 1.5 KHz or between −500 Hz and −1.5 KHz.

4. The wireless device of claim 3, wherein the Boolean operation comprises an exclusive OR (XOR).

5. The wireless device of claim 1, wherein the transmission logic is further to;
   randomly generate a second frequency offset for each of a series of frame synch packets based on bits within respective packets of the series of frame synch packets, wherein the series of frame synch packets includes the frame synch packet; and
   cause the transmitter to modify, with each respective second frequency offset, a frequency of each corresponding frame synch packet of the series of frame synch packets transmitted to the receiver during a period of distance ranging between the transmitter and the receiver.

6. The wireless device of claim 1, wherein the transmitter is one of a heterodyne or a superheterodyne transmitter, and wherein the transmission logic causes the frequency offset to be applied to the frequency of the frame synch packet via a digital low intermediate frequency filter of the transmitter.

7. A method comprising:
   randomly generating, by transmission logic of a transmitter adapted with Bluetooth® low energy (BLE) capability, a frequency offset based on bits within a frame synch packet to be transmitted during a keyless access attempt of a resource having a receiver;
   causing the bits of the frame synch packet to be encrypted with an encryption key;
   causing a frequency of the frame synch packet to be modified by the frequency offset; and
   transmitting, by the transmitter, the frame synch packet to the receiver, wherein, to gain access to the resource, the frequency offset is detectable the frequency by the receiver as a security signature.

8. The method of claim 7, further comprising:
   receiving, by the receiver, the frame synch packet;
   identifying a frame synchronization pattern at a portion of the frame synch packet;
   computing the frequency offset based on the frame synchronization pattern;
   determining a bias value corresponding to a particular data pattern within the frame synchronization pattern;
   applying a correction to the computed frequency offset based on the bias value to generate a corrected frequency offset;
   identifying the encrypted bits of the frame synch packet;
   generating, by the receiver, an expected frequency offset based on the identified encrypted bits; and enabling access, by the receiver, to the resource in response at least in part to the expected frequency offset matching the corrected frequency offset.

9. The method of claim 7, wherein the bits comprise all bits of the frame synch packet.

10. The method of claim 7, wherein randomly generating the frequency offset comprises:
performing a Boolean operation on the bits; and
identifying a predetermined negative or positive frequency offset based on a result of the Boolean operation.

11. The method of claim 10, wherein the Boolean operation comprises an exclusive OR (XOR).

12. The method of claim 7, further comprising:
randomly generating a second frequency offset for each of a series of frame synch packets based on bits within respective packets of the series of frame synch packets, wherein the series of frame synch packets includes the frame synch packet; and
causing the transmitter to modify, with each respective second frequency offset, a frequency of each corresponding frame synch packet of the series of frame synch packets transmitted to the receiver during a period of distance ranging between the transmitter and the receiver.

13. The method of claim 7, wherein the transmitter is one of a heterodyne or a superheterodyne transmitter, and causing the frequency of the frame synch packet to modified comprises causing the frequency offset to be applied to the frequency of the frame synch packet via a digital low intermediate frequency filter of the transmitter.

14. A system comprising:
a transmission device that is to transmit Bluetooth® low energy (BLE) frame synch packets that comprise a frequency offset as a security signature; and
a receiving device to receive the frame synch packets, the receiving device comprising:
an antenna;
a receiver coupled to the antenna and adapted with BLE capability; and
logic at least one of coupled to or integrated with the receiver, the logic to:
identify a frame synchronization pattern at a portion of a frame synch packet of the frame synch packets;
compute the frequency offset based on the frame synchronization pattern;
detect a particular data pattern within the frame synchronization pattern, wherein the particular data pattern comprises one or more of a singleton pattern, a transition pattern, or a non-transition pattern;
determine a bias value for each of the one or more of the singleton pattern, the transition pattern, or the non-transition pattern;
apply a correction to the computed frequency offset based on a combination of the bias values to generate a corrected frequency offset;
identify bits of the frame synch packet;
generate an expected frequency offset based on the identified bits; and
enable access, by the transmission device, to a resource protected by the receiving device in response at least in part to the expected frequency offset matching the corrected frequency offset to within a threshold accuracy level.

15. The system of claim 14, wherein the identified bits comprise all bits of the frame synch packet.

16. The system of claim 14, wherein, to generate the expected frequency offset, the logic is further to:
perform a Boolean operation on the identified bits; and
identify a predetermined negative or positive frequency offset based on a result of the Boolean operation, the expected frequency offset being one of between 500 hertz (Hz) and 1.5 kHz or between −500 Hz and −1.5 kHz.

17. The system of claim 16, wherein the Boolean operation comprises an exclusive OR (XOR).

18. The system of claim 14, wherein the logic is further to:
generate a set of corrected frequency offsets, each corrected frequency offset associated with each frame synch packet of a series of frame synch packets received during distance ranging;
average frequency offsets of the set of corrected frequency offsets; and
estimate, to within the threshold accuracy level, that a frequency of at least one of the series of frame synch packets includes the average frequency offset.

19. The system of claim 14, wherein the receiver is one of a heterodyne or a superheterodyne receiver, and wherein, to estimate that a frequency of the frame synch packet, including the frequency offset, the logic is to cause the frame packet to be filtered by a digital low intermediate frequency filter of the receiver.

* * * * *